2,945,063

PREPARATION OF CYCLOHEXANE METHYLAMINE

John F. Quinn and Marrine A. Terpstra, Kirkwood, Mo., assignors to Monsanto Chemical Company, St. Louis, Mo., a corporation of Delaware No Drawing. Filed July 26, 1956, Ser. No. 600,177

4 Claims. (Cl. 260—563)

This invention relates to the preparation of cyclohexane methylamine by the catalytic reduction of benzonitrile.

Several methods have been proposed for the preparation of cyclohexane methylamine. One method suggested is the hydrogenation of benzyl amine in the presence of platinum as a catalyst. Another method proposed is the passing of cyclohexyl carbinol and $NH_3$ over a nickel aluminum catalyst. Still another method contemplates treating cyclohexyl carbinol with an ammonia mercury amalgam. There are several suggestions in the literature that benzonitrile and benzyl amine are not reduced to saturated amines when nickel is used as a catalyst.

However, it has now been discovered that benzonitrile can be reduced in the presence of a nickel catalyst to cyclohexane methylamine. This process comprises first reducing benzyl nitrile to benzyl amine in the presence of finely divided nickel and then reducing the benzyl amine thus formed in the presence of finely divided nickel promoted by a small amount of barium hydroxide and an alkali metal hydroxide. Obviously the process of this invention also contemplates as a starting material benzyl amine and reducing this amine to cyclohexane methylamine in the presence of finely divided nickel promoted with small amounts of barium hydroxide and an alkali metal hydroxide. The first step in this process, the reduction of benzonitrile to benzyl amine, is carried out at a temperature of from about 50° C. to about 150° C. and at a hydrogen pressure in excess of 500 pounds per square inch. The second step, the reduction of benzyl amine to cyclohexane methylamine is carried out at a temperature of from 130° C. and above and at a pressure above 500 pounds per square inch.

The finely divided nickel catalyst which is useful according to the process of this invention can be obtained from a nickel alloy by leaching the alloying metal with an alkaline material such as an alkaline metal hydroxide such as the Raney nickel catalyst. Also, the finely divided nickel catalyst can be prepared by reducing a nickel salt of a weak readily decomposable acid such as nickel carbonate, nickel formate, nickel acetate and the like. Such nickel salts can be thoroughly decomposed to a finely divided nickel. In the reduction of benzonitrile to benzyl amine only a small amount of finely divided nickel catalyst is required. The amount of finely divided nickel which will give satisfactory results is from about 0.5% to about 2% by weight based on the benzonitrile. However, larger amounts of nickel catalyst can be employed if desired without deleterious effect. In the reduction of benzyl amine to cyclohexane methylamine a slightly larger amount of a finely divided nickel catalyst is required. It has been found that the amount of finely divided nickel required to catalyze the reduction of benzyl amine should be at least about three and one-half to four percent by weight based on the benzyl amine and best results will be obtained by the use of from about 4 to about 5% by weight of finely divided nickel based on the benzyl amine. Again, larger amounts of the catalyst can be employed without deleterious effect. In addition to the above preferred forms of nickel catalyst there can also be employed nickel obtained as precipitated nickel or finely divided nickel obtained by the comminution of metallic nickel. Although useful, such forms of finely divided nickel are not as efficient, that is, they either produce a slower rate of reduction or one less efficient in that it produces lower yields.

In the reduction of benzyl amine to cyclohexane methylamine the finely divided nickel is promoted by the presence of small amounts of barium hydroxide and an alkali metal hydroxide. The ratio of barium hydroxide to nickel is about 0.5 to 3.0 parts by weight of barium hydroxide for each part by weight of finely divided nickel. The ratio of sodium hydroxide to barium hydroxide is about 1 part alkali metal hydroxide for each 5 to 20 parts by weight of barium hydroxide. The preferred alkali metal hydroxide to be used in the second step or the reduction of benzyl amine is sodium hydroxide.

The following examples are intended to be illustrative only and are not intended to be a limitation on the invention herein disclosed. In these examples the term "parts" is employed to indicate parts by weight.

Example 1

300 parts by weight of benzonitrile and 5 parts by weight of a mineral oil dispersion of finely divided nickel containing 60% by weight nickel are charged into an autoclave. This mixture is agitated until the nickel catalyst is well dispersed therein, whereupon the autoclave is purged with hydrogen to free the system of oxygen. The autoclave is then sealed and the pressure therein increased to 500 pounds per square inch with hydrogen. The resulting mixture is stirred and heated slowly. At about 80° C. a pressure drop will be noted indicating that the reaction has started. Then the hydrogen pressure is increased to 900 pounds per square inch. As the reaction proceeds the temperature of the reactants is not permitted to exceed about 130° C. When no further hydrogen is adsorbed, in about 2 to 3 hours of reaction, the temperature is maintained at about 120 to 130° C. and pressure at about 900 pounds per square inch hydrogen is maintained for an additional 15 minutes.

There is then charged into the autoclave 10 parts by weight of the nickel mineral oil mixture described above combined with 9 parts by weight of barium hydroxide and 1.5 parts by weight of an aqueous solution of sodium hydroxide containing 50% by weight NaOH. The resulting mixture is stirred and heated to about 130° C., at which temperature a pressure drop is again noted indicating hydrogenation of the benzene ring. The pressure in the autoclave is maintained at 900 pounds per square inch and the reactants permitted to reach a maximum temperature of about 180° C. In about 3 hours the source of the hydrogen is shut off and the reaction is completed when hydrogen is no longer absorbed. The reaction mixture is held at about 180° C. and the final hydrogen pressure for about 15 minutes and then cooled to about 70° C. with stirring. The agitation is stopped and the autoclave cautiously vented to remove the hydrogen. The resulting mixture is then filtered to remove the catalyst. The filtrate is then charged to distillation equipment where the cyclohexane methylamine can be recovered at reduced pressure.

A yield of cyclohexane methylamine of about 80% by weight is obtained by distilling the reaction mixture at about 80 mm. Hg, discarding the material having a vapor pressure of about 35° to 70° C., collecting the material which has a vapor temperature of about 88 to 91° C. The materials having a vapor temperature of 70 to 88° C. are collected and charged into the next batch. These collected materials of a vapor temperature of 70° to 88° C. at 80 mm. Hg amount to about 1 to 2% of the materials charged into the still. The forerun, material having a vapor temperature of 35 to 70° C., will be about 4% of the materials charged. The remainder contains a substantial amount of diamine.

*Example II*

The process of Example I is repeated except that 116 parts of benzonitrile and about 1.9 parts of the nickel catalyst in the mineral oil are charged to the autoclave. After the benzonitrile has converted to benzyl amine 5.6 parts of the nickel mineral oil mixture, 3.5 parts of barium hydroxide and 0.6 part of the aqueous solution of sodium hydroxide containing about 50% by weight of NaOH are added to the autoclave. There is obtained from this process a yield of cyclohexane methylamine of about 81% of the theoretical yield base on benzonitrile.

*Example III*

The process of Example I is repeated except that potassium hydroxide is employed in the place of sodium hydroxide in the reduction of benzyl amine to cyclohexane methylamine. From this process there is obtained cyclohexane methylamine in a yield of about 78% of the theoretical yield.

*Example IV*

300 parts by weight of benzyl amine, 9 parts by weight of finely divided Raney nickel, 9 parts by weight of barium hydroxide and 1.0 part by weight of NaOH are charged to an autoclave. The resulting mixture is stirred until a uniform dispersion of catalyst is obtained. Thereafter the autoclave is purged of oxygen with hydrogen and hydrogen is charged to a pressure of about 500 pounds per square inch. The resulting mixture is stirred and heated to about 130 to 150° C. and the hydrogen pressure increased to about 900 pounds per square inch when reaction begins and there maintained until no further adsorption of hydrogen is taking place. The resulting mixture is treated as described in Example I. The cyclohexane methylamine recovered by the distillation of material so produced at the reduced pressure represents a yield of about 80% of the theoretical yield.

Although the present invention has been illustrated by specific examples in which there were employed precise quantities of materials, it is not intended that this invention be limited solely thereto since many obvious modifications are possible without departing from the spirit of this invention, rather it is intended that the scope of this invention be limited only by the appended claims.

What is claimed is:

1. In the process for the preparation of cyclohexane methylamine by the catalytic reduction of benzonitrile the steps comprising: heating at a temperature above 50° C. and at superatmospheric hydrogen pressure a mixture containing benzyl nitrile and hydrogen in the presence of a finely divided nickel catalyst until the benzonitrile is reduced to benzyl amine and thereafter heating at temperatures of from 130° C. and above and at pressures above 500 pounds per square inch a mixture comprising benzyl amine and hydrogen in the presence of a nickel catalyst promoted with a small amount of barium hydroxide and an alkali metal hydroxide until cyclohexane methylamine has been formed.

2. In the process for the preparation of cyclohexane methylamine by the catalytic reduction of benzonitrile the steps comprising: heating at a temperature of from about 50° C. to about 150° C. and at a hydrogen pressure above 500 pounds per square inch a mixture containing benzyl nitrile and hydrogen in the presence of a finely divided nickel catalyst until the benzonitrile is reduced to benzyl amine and thereafter heating at temperatures of from 130° C. and above and at pressures above 500 pounds per square inch a mixture comprising benzyl amine and hydrogen in the presence of a nickel catalyst promoted with a small amount, at least about 0.5 part by weight for each part by weight of nickel, of barium hydroxide and a small amount, at least about 1 part by weight for each 5 to 20 parts by weight of barium hydroxide, of sodium hydroxide until cyclohexane methylamine has been formed.

3. In the process for preparing cyclohexane methylamine by the catalytic reduction of benzyl amine, the steps comprising: heating at a temperature of from 130° C. and above and at a pressure above 500 pounds per square inch a mixture containing benzyl amine and hydrogen in the presence of a finely divided nickel catalyst promoted with from about 0.5 to 3.0 parts by weight of barium hydroxide for each part by weight of nickel and at least about 1 part by weight of an alkali metal hydroxide for each 5 to 20 parts by weight of barium hydroxide until cyclohexane methylamine has been formed.

4. The process of claim 3 wherein the alkali metal hydroxide is sodium hydroxide.

References Cited in the file of this patent

UNITED STATES PATENTS

| | | |
|---|---|---|
| 1,927,130 | Lommel et al. | Sept. 19, 1933 |
| 2,166,971 | Schmidt et al. | July 25, 1939 |
| 2,571,016 | Dankert et al. | Oct. 9, 1951 |

OTHER REFERENCES

Sabatier et al.: Chem. Zentralblatt, 82, 1911, page 953.
Skita: Ber. Deut. Chem., vol. 57B, 1977–80 (1924).
Mignonac: Chem. Abst., vol. 29, 1074 (1935).
Adkins et al.: J.A.C.S., vol. 70, 695–8 (1948).